United States Patent
Mishra et al.

(10) Patent No.: US 10,374,814 B2
(45) Date of Patent: Aug. 6, 2019

(54) ACCESS POINT CLOUD CONTROLLER AUTO-DISCOVERY

(71) Applicant: EXTREME NETWORKS, INC., San Jose, CA (US)

(72) Inventors: Rajeev Kumar Mishra, Bangalore (IN); Senthilraj Shanmugavadivel, Coimbatore (IN); Dominic Velikakath Peter, Bangalore (IN); Jeelan Basha Poola, Bangalore (IN)

(73) Assignee: EXTREME NETWORKS, INC., San Jose, CA (US)

(*) Notice: Subject to any disclaimer, the term of this patent is extended or adjusted under 35 U.S.C. 154(b) by 155 days.

(21) Appl. No.: 15/219,461

(22) Filed: Jul. 26, 2016

(65) Prior Publication Data

US 2018/0035274 A1 Feb. 1, 2018

(51) Int. Cl.
| | |
|---|---|
| *H04W 4/00* | (2018.01) |
| *H04L 12/18* | (2006.01) |
| *H04W 24/02* | (2009.01) |
| *H04L 29/08* | (2006.01) |
| *H04W 88/08* | (2009.01) |

(52) U.S. Cl.
CPC ............ *H04L 12/18* (2013.01); *H04W 24/02* (2013.01); *H04L 67/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,538,446 B1* | 1/2017 | Kaushik | H04W 36/30 |
| 2009/0129291 A1 | 5/2009 | Gupta et al. | |
| 2014/0334471 A1* | 11/2014 | Chen | H04W 16/06 |
| | | | 370/338 |
| 2015/0036488 A1 | 2/2015 | Mettu et al. | |
| 2015/0201370 A1 | 7/2015 | Desai et al. | |
| 2016/0094387 A1* | 3/2016 | Stephenson | H04L 63/0823 |
| | | | 709/222 |

(Continued)

FOREIGN PATENT DOCUMENTS

EP    1763177 A1    3/2007

OTHER PUBLICATIONS

Filing Receipt dated Sep. 29, 2015 in related U.S. Appl. No. 14/844,064.

(Continued)

*Primary Examiner* — Chi H Pham
*Assistant Examiner* — Fahmida S Chowdhury
(74) *Attorney, Agent, or Firm* — Sterne, Kessler, Goldstein & Fox P.L.L.C.

(57) ABSTRACT

Access point cloud controller auto-discovery is provided. An access point, in communication with other access points, receives data indicative of whether each of other access points are managed using a cloud controller or a local controller. When the data is indicative that at least one of the other access points is managed using the cloud controller, the access point is configured to be cloud-controller-managed. When the data is indicative that none of the other access points is managed using the cloud controller, and when the data is further indicative that at least one of the other access points is managed using the local controller, the access point is configured to be local-controller-managed.

20 Claims, 13 Drawing Sheets

(56) References Cited

U.S. PATENT DOCUMENTS

2017/0134940 A1* 5/2017 Sharma ................ H04W 12/04
2017/0272317 A1* 9/2017 Singla ................ H04L 41/0806

OTHER PUBLICATIONS

Notification of the International Application Number and of the International filing date dated Jun. 14, 2016 in related PCT Application PCT/US2016/036321.
International Search Report and Written Opinion for International Patent Application No. PCT/US2016/036321 dated Jul. 29, 2016.

* cited by examiner

ACCESS POINT CLOUD CONTROLLER AUTO-DISCOVERY

BACKGROUND

Access Points (APs), for example in a WiFi network, can be managed using a local controller (which can also be referred to as a private controller) or a cloud controller. When there is a plurality of APs, some APs can be cloud-controller-managed, and some can be local-controller-managed. When a new access point is deployed in an existing network of APs, configuring whether the new access point is cloud-controller-managed or local-controller-managed is generally performed manually. Such manual configuration is time consuming and cumbersome, especially when a plurality of new access points are deployed, for example to expand the network and/or to replace existing access points.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
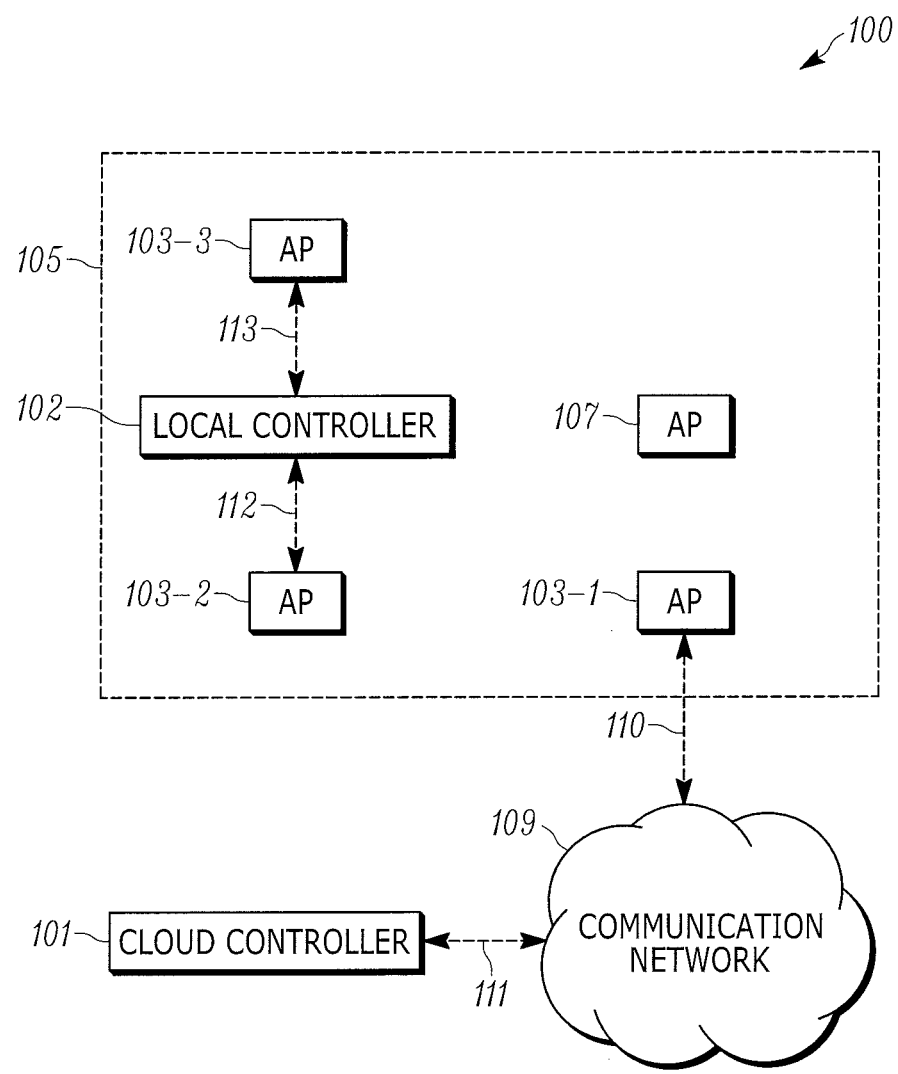
FIG. 1 depicts a schematic diagram of a system for configuring an access point, according to non-limiting implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides an access point comprising: a processor, and a communication interface configured to communicate with one or more other access points, the processor configured to: receive, using the communication interface, data indicative of whether each of the other access points are managed using a cloud controller or a local controller; when the data is indicative that at least one of the other access points is managed using the cloud controller, cause the access point to be cloud-controller-managed; and, when the data is indicative that none of the other access points is managed using the cloud controller, and when the data is further indicative that at least one of the other access points is managed using the local controller, cause the access point to be local-controller-managed.

The processor can be further configured to: when the data is indicative that at least one of the other access points is managed using the cloud controller, and when the data is further indicative that others of the other access points are managed using the local controller, cause the access point to be cloud-controller-managed.

The processor can be further configured to cause the access point to be cloud-controller-managed by: using the communication interface to communicate with the cloud controller, and receiving management parameters from the cloud controller.

The access point can further comprise a memory storing a network address of the cloud controller, wherein the processor can be further configured to cause the access point to be cloud-controller-managed by: using the communication interface to communicate with the cloud controller using the network address.

The data can comprise a network address of the cloud controller, wherein the processor can be further configured to cause the access point to be cloud-controller-managed by: using the communication interface to communicate with the cloud controller using the network address received in the data.

The processor can be further configured to cause the access point to be local-controller-managed by: using the communication interface to communicate with a respective local controller in communication with the communication interface, and receiving management parameters from the respective local controller.

The processor can be further configured to receive the data from the other access points by one or more of: transmitting a request for the data to the other access points, receiving the data from other access points in response to the request, and passively receiving the data as one or more of a broadcast and a multicast from the other access points.

The processor can be further configured to: when the processor determines that the access point is a first access point in a network; or when the data is indicative that none of the other access points is managed using the cloud controller or the local controller: initiate a discovery process to determine whether to cause the access point to be cloud-controller-managed or local-controller-managed. The discovery process can comprise: when the communication interface is connected to a respective local controller, causing the access point to be local-controller-managed; when the communication interface is not connected to the respective local controller, determining, using the communication interface, whether an identifier of the access point has been cloud controller associated; and, when the identifier has been cloud controller associated, causing the access point to be cloud-controller-managed. The processor can be further configured to: when the communication interface is not connected to the respective local controller and when the identifier has not been cloud controller associated, repeat the discovery process until one of the communication interface is connected to the respective local controller and the identifier has been cloud controller associated.

The processor can be further configured to: when the access point boots up, communicate with the cloud controller; and receive initial data from the cloud controller indicating whether the access point is to be cloud-controller-managed or local-controller-managed, the initial data superseding the data indicative of whether each of the other access points are managed using the cloud controller or the local controller.

Another aspect of the specification provides a method comprising: at an access point including: a processor, and a communication interface configured to communicate with one or more other access points, receiving, at the processor, using the communication interface, data indicative of whether each of the other access points are managed using a cloud controller or a local controller; when the data is indicative that at least one of the other access points is managed using the cloud controller, causing, using the processor, the access point to be cloud-controller-managed; and, when the data is indicative that none of the other access points is managed using the cloud controller, and when the data is further indicative that at least one of the other access points is managed using the local controller, causing, using the processor, the access point to be local-controller-managed.

The method can further comprise: when the data is indicative that at least one of the other access points is managed using the cloud controller, and when the data is further indicative that others of the other access points are managed using the local controller, causing the access point to be cloud-controller-managed.

The method can further comprise causing the access point to be cloud-controller-managed by: using the communication interface to communicate with the cloud controller, and receiving management parameters from the cloud controller.

The access point can further comprise a memory storing a network address of the cloud controller, and the method can further comprise causing the access point to be cloud-controller-managed by: using the communication interface to communicate with the cloud controller using the network address.

The data can comprises a network address of the cloud controller, and the method can further comprise causing the access point to be cloud-controller-managed by: using the communication interface to communicate with the cloud controller using the network address received in the data.

The method can further comprise causing the access point to be local-controller-managed by: using the communication interface to communicate with a respective local controller in communication with the communication interface, and receiving management parameters from the respective local controller.

The method can further comprise receiving the data from the other access points by one or more of: transmitting a request for the data to the other access points, receiving the data from other access points in response to the request, and passively receiving the data as one or more of a broadcast and a multicast from the other access points.

The method can further comprise: when the processor determines that the access point is a first access point in a network; or when the data is indicative that none of the other access points is managed using the cloud controller or the local controller: initiating a discovery process to determine whether to cause the access point to be cloud-controller-managed or local-controller-managed. The discovery process can comprise: when the communication interface is connected to a respective local controller, causing the access point to be local-controller-managed; when the communication interface is not connected to the respective local controller, determining, using the communication interface, whether an identifier of the access point has been cloud controller associated; and, when the identifier has been cloud controller associated, causing the access point to be cloud-controller-managed. The method can further comprise: when the communication interface is not connected to the respective local controller and when the identifier has not been cloud controller associated, repeating the discovery process until one of the communication interface is connected to the respective local controller and the identifier has been cloud controller associated.

The method can further comprise: when the access point boots up, communicating with the cloud controller; and receiving initial data from the cloud controller indicating whether the access point is to be cloud-controller-managed or local-controller-managed, the initial data superseding the data indicative of whether each of the other access points are managed using the cloud controller or the local controller.

Yet a further aspect of the specification provides a computer-readable medium storing a computer program, wherein execution of the computer program is for: at an access point including: a processor, and a communication interface configured to communicate with one or more other access points, receiving, at the processor, using the communication interface, data indicative of whether each of the other access points are managed using a cloud controller or a local controller; when the data is indicative that at least one of the other access points is managed using the cloud controller, causing, using the processor, the access point to be cloud-controller-managed; and, when the data is indicative that none of the other access points is managed using the cloud controller, and when the data is further indicative that at least one of the other access points is managed using the local controller, causing, using the processor, the access point to be local-controller-managed. The computer-readable medium can comprise a non-transitory computer-readable medium.

Attention is directed to FIG. 1 which depicts a schematic diagram of a system 100 configured for configuring an access point. System 100 comprises a cloud controller 101, a local controller 102, a plurality of access points 103-1, 103-2, 103-3 (interchangeably referred to hereafter, collectively, as APs 103 and, generically, as an AP 103) deployed at respective locations in a physical space 105 interchangeably referred to herein as space 105), a new AP 107 being deployed in space 105, and a communication network 109 (interchangeably referred to herein as network 109). While only three APs 103 are depicted in system 100, system 100 can comprises more than three APs 103 and fewer than three APs 103; indeed, system 100 can comprises as few as one AP 103, or even no APs 103 when AP 107 is the first AP deployed in space 105.

Each AP 103 is configured to provide wireless access to network 109 (and the like) to communication devices, mobile devices, and the like (not depicted) in a communication range of each AP 103. Hence, for example, each AP 103 can comprise one or more of a WiFi access point, a WiMax access point, and the like. As such, while not depicted, each AP 103 is further in communication with network 109, and is configured to convey data between communication devices, mobile devices, and the like and network 109.

Each AP 103 is further configured to communicate with other APs 103, for example by broadcasting data to other APs 103 in a respective communication range, and/or upon request from another AP 103 in a respective communication range, as described in more detail below.

Each AP 103 is further controlled using one of cloud controller 101 and local controller 102. For example, AP 103-1 is in communication with cloud controller 101 via network 109 using a communication link 110 between AP 103-1 and network 109, and a communication link 111 between cloud controller 101 and network 109.

Communication links referred to herein will also be interchangeably referred to as a link. Indeed, link 110 is also an example of a communication link via which AP 103-1 can provide access to network 109 for a communication device, a mobile device, and the like. However links 110, 111 are also used for communication between cloud controller 101 and AP 103-1. In other words, cloud controller 101 comprises an AP controller located "in the cloud", and hence AP 103-1 can be referred to as being "cloud-controller-managed". In some implementations, such cloud controller management can include, but is not limited to, cloud controller 101 transmitting, to each AP 103 managed by cloud controller 101, parameters for controlling each AP 103 managed by cloud controller 101 which can include, but are not limited to, a new SSID (Service Set Identifier) an IP (internet protocol) address, and the like.

In contrast, each of APs 103-2, 103-3 is controlled using local controller 102 via respective links 112, 113. Local controller 102 can also be located in space 105, but is otherwise generally local to each of APs 103-2, 103-3. Indeed, local controller 102 can be interchangeably referred to as a "private controller", as such private controllers can be private to space 105. In certain non-limiting implementations, each of links 112, 113 can be wired, and local controller 102 is generally configured to locally control each of APs 103-2, 103-3. In other words, local controller 102 can comprise an AP controller local to space 105 and/or APs 103-2, 103-3, and hence APs 103-2, 103-3 can be referred to as being "local-controller-managed". In some implementations, such local controller management can include, but is not limited to, local controller 102 transmitting, to each AP 103 managed by local controller 102, parameters for controlling each AP 103 managed by local controller 102, which can include, but are not limited to, a new SSID (Service Set Identifier) an IP (internet protocol) address, and the like.

Indeed, local controller 102 can be configured to control a plurality of APs 103, up to a maximum number; hence, when a number of APs 103 to be managed in space 105 exceeds the maximum number, a new local controller would need to be deployed and configured appropriately. Furthermore, while wireless communication between local controllers and APs 103 can be used, generally such communication is wired, and such wiring can be cumbersome. Hence, use of local controllers is not easily scalable.

In contrast, cloud controller management, for example using cloud controller 101, can be easily scalable, and can further obviate wiring; however, when new AP 107 is deployed in space 105, it can be determined whether new AP 107 is to be cloud-controller-managed or local-controller-managed, as described in more detail below.

Each of cloud controller 101, local controller 102, and APs 103, 107 will now be described in more detail.

Figure 2:
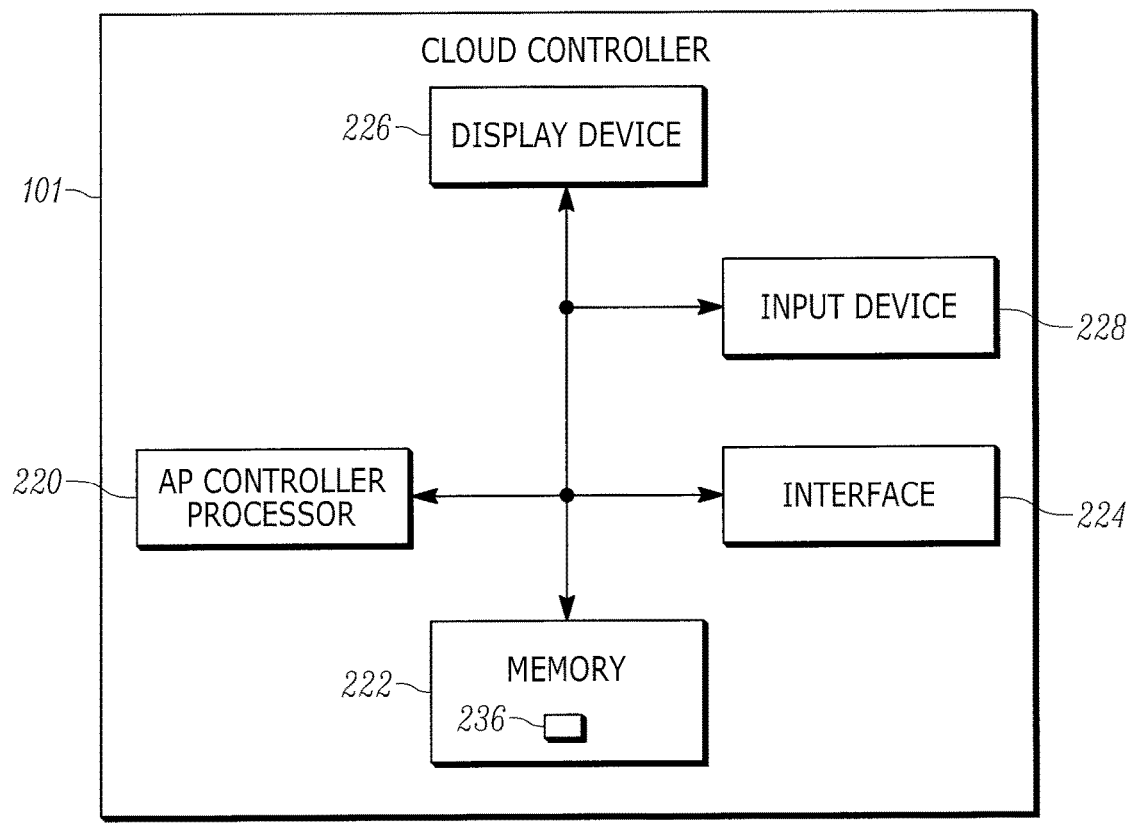
FIG. 2 depicts a schematic diagram of a cloud controller of the system of FIG. 1, according to non-limiting implementations.

Attention is next directed to FIG. 2 which depicts a schematic diagram of cloud controller 101. Cloud controller 101 comprises: an AP controller processor 220; a memory 222; and a communication interface 224 (interchangeably referred to hereafter as interface 224). As depicted, cloud controller 101 further comprises a display device 226 and at least one input device 228, however such components are optional. Furthermore, when present, display device 226 and input device 228 can also be external to cloud controller 101, and processor 220 can be in communication with any such external components via a suitable connection and/or link.

Processor 220 is generally configured to control and/or configure one or more APs 103, 107 including, but not limited to, AP 103-1. Such control can include, but is not limited to, client authentication (e.g. authenticating devices in communication with AP 103-1), group management, quality of service monitoring and management, tunneling management, firewall services and management, spectrum monitoring and analysis, and the like. Indeed, processor 220 can be generally configured to provide any controller and/or management services for one or more APs 103, 107 that can also be provided by a local controller, such as local controller 102, however at cloud controller 101, such services can be scalable.

Indeed, cloud controller 101 can comprise any computing device suitable for providing controller and/or management services to one or more APs 103, 107 including, but not limited to, a personal computer, a laptop computer and any suitable server device, which can be commercially available and/or specifically configured for providing controller and/or management services to one or more APs 103, 107. In some implementations, cloud controller 101 can comprise a DHCP (Dynamic Host Configuration Protocol) server.

Processor 220 can comprise a processor and/or a plurality of processors, including but not limited to one or more central processors (CPUs) and/or one or more processing units and/or one or more graphic processing units (GPUs); either way, processor 220 comprises a hardware element and/or a hardware processor. Indeed, in some implementations, processor 220 can comprise an ASIC (application-specific integrated circuit) and/or an FPGA (field-programmable gate array) specifically configured to implement the functionality of cloud controller 101. In other words, processor 220 can comprise an AP controller processor, and hence, cloud controller 101 is preferably not a generic computing device, but a device specifically configured to implement specific AP controller and/or management functionality. For example, cloud controller 101 and/or processor 220 can specifically comprise a computer executable engine configured to control and/or manage APs 103, 107 in space 105.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of cloud controller 101 as described herein are typically maintained, persistently, in memory 222 and used by processor 220 which makes appropriate utilization of volatile storage during the execution of such programming instructions. Those skilled in the art recognize that memory 222 is an example of computer readable media that can store programming instructions executable on processor 220. Furthermore, memory 222 is also an example of a memory unit and/or memory module and/or a non-volatile memory.

In particular, memory 222 can store an application 236 that, when executed by processor 220, enables processor 220 to implement specific AP controller and/or management functionality.

While not depicted, memory 222 can further store identifiers of APs being managed and/or controlled by cloud controller 101, as well as parameters associated with each, including, but not limited to, IP addresses, SSIDs, and the like.

As depicted, processor 220 also connects to interface 224, which can be implemented as one or more radios and/or connectors and/or network adaptors, configured to communicate wired and/or wirelessly with one or more communication networks, including network 109. It will be appreciated that interface 224 is configured to correspond with network architecture that is used to implement one or more communication links 111 to network 109, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

Processor 220 can be further configured to communicate with optional display device 226, which comprises any suitable one of, or combination of, flat panel displays (e.g. LCD (liquid crystal display),plasma displays, OLED (organic light emitting diode) displays, capacitive or resistive touchscreens, CRTs (cathode ray tubes) and the like). Processor 220 be further configured to communicate with input device 228, which is configured to receive input data; as such, input device 228 can comprise any suitable combination of input devices, including but not limited to a keyboard, a keypad, a pointing device, a mouse, a track wheel, a trackball, a touchpad, a touch screen (e.g. integrated with display device 226), and the like. Other suitable input devices are within the scope of present implementations.

While not depicted, cloud controller 101 further comprises a power supply, including, but not limited to, a connection to a mains power supply and/or a power adaptor (e.g. and AC-to-DC (alternating current to direct current) adaptor), and alternatively a battery, a power pack and the like. In general the power supply powers components of cloud controller 101.

In general, cloud controller 101 can manage any number of APs 103, which can be remote to cloud controller 101, by storing an address and configuration parameters and/or management parameters to memory 222, of example in application 236 and/or in a separate database and/or table (not depicted) stored in memory 222.

Hence, it should be understood that in general a wide variety of configurations for cloud controller 101 are contemplated and cloud controller 101 can include other components, including, but not limited to, a speaker, a microphone and the like.

While not depicted, it is assumed that local controller 102 can have a similar architecture to that of cloud controller 101 depicted in FIG. 2. However, local controller 102 can be configured to control only a given maximum number of APs 103. For example, when local controller 102 is in wired communication with APs 103-2, 103-3 etc., a respective communication interface can have a given number of wired ports (which can receive a wired portion of links 112, 113) corresponding to a maximum number of APs 103 that can be controlled by local controller 102.

Figure 3:
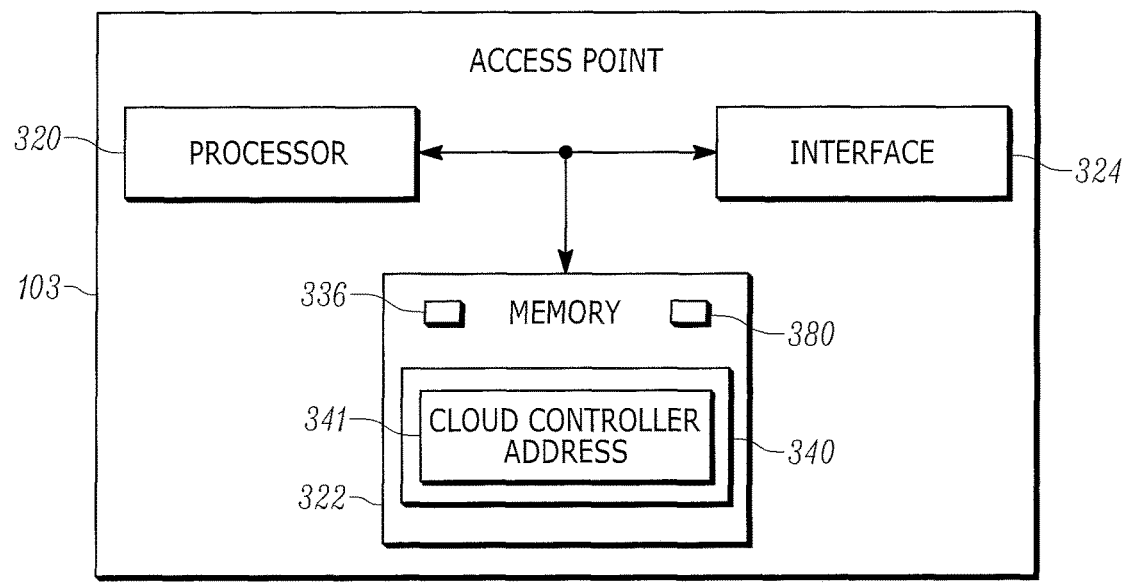
FIG. 3 depicts a schematic diagram of an access point of the system of FIG. 1, according to non-limiting implementations.

Attention is next directed to FIG. 3 which depicts a schematic diagram of an AP 103, which comprises: a processor 320; a memory 322; and a communication interface 324 (interchangeably referred to hereafter as interface 324). Each of processor 320, memory 322 and wireless communication interface 324 is generally similar, respectively, to processor 220, memory 222 and interface 224, though adapted and/or selected and/or configured for use with AP 103. Hence, interface 324 is generally configured to communicate wirelessly with communication devices, mobile devices and other APs 103 in a communication range of interface 324.

However, in other implementations, one or more of APs 103, including AP 103 depicted in FIG. 3, can be connected to neighboring APs 103 via a wired link, using cables, and the like. Hence, in these implementations, interface 324 can be configured to communicate with respective communication interfaces of one or more neighboring APs 103 using wires, cables and the like.

When AP 103 depicted in FIG. 3 is used to communicate with local controller 102, interface 324 can include a port for receiving a wired link, such as a wired portion of link 112, or link 113. Similarly, when AP 103 depicted in FIG. 3 is used to communicate with one or more neighboring APs 103, interface 324 can include one or more ports, each for receiving a respective wired link connected to a respective neighboring AP 103.

In particular, whether APs 103 (and/or AP 107) are in communication via wired and/or wireless links, data can be distributed from AP 103 (and/or AP 107) to other APs 103 (and/or AP 107) in system 100, by a given AP 103, 107 receiving data from a neighboring AP 103, 107, and transmitting the data to respective neighboring APs 103, 107. As such, APs 103, 107 can form a mesh network and/or a local network in which data can be transmitted between neighboring APs 103, 107 to distribute the data throughout APs 103, 107. Indeed, any communications between APs 103, 107, as described herein, can occur using wired and/or wire links, and furthermore data can be distributed between neighboring APs 103, 107. Interface 324 and processor 320 can be adapted accordingly.

Furthermore, processor 320 and memory 322 are selected for compatibility with AP 103, rather than for compatibility with a more complex computing environment as can exist in cloud controller 101.

Programming instructions that implement the functional teachings of AP 103 as described herein are typically maintained, persistently, in memory 322 and used by processor 320 which makes appropriate utilization of volatile storage during the execution of such programming instructions. Memory 322 further stores an application 336 that, when executed by processor 320, enables processor 320 to implement the functionality of AP 103 including, but not limited to, communicating with a respective controller (e.g. cloud controller 101 and/or local controller 102), communicating with other APs 103, and relating data between communication devices, mobile devices, and the like, and network 109. Those skilled in the art recognize that memory 322 is an example of computer readable media that can store programming instructions executable on processor 320. Furthermore, memory 322 is also an example of a memory unit and/or memory module and/or a non-volatile memory.

Memory 322 can further store data 340 indicative of whether the respective AP 103 depicted in FIG. 3 is managed using a cloud controller or a local controller. For example, data 340 can comprise a flag, text, and the like indicating whether the respective AP 103 is cloud-controller-managed or local-controller-managed. As depicted, data 340 can optically comprise an address 341 of cloud controller 101, which can indicate that the respective AP 103 depicted in FIG. 3 is cloud-controller-managed. Address 341 can comprise one or more of an IP (internet protocol) address of cloud controller 101, a URL (Uniform Resource Locator) of cloud controller 101, any other address which can enable an AP 103 (or new AP 107) to communicate with cloud controller 101, and the like.

Hence, for example, the respective AP 103 depicted in FIG. 3 storing address 341 can correspond to AP 103-1. Address 341 can be stored in memory 322 at a factory and/or in a provisioning process and/or in a controller discovery process, and the like. Alternatively, as will be described in more detail below, address 341 can be received from another AP 103.

However, when the respective AP 103 depicted in FIG. 3 is local-controller-managed, as with APs 103-2, 103-3, address 341 may not be stored in memory 322, but rather data 340 can indicate that the respective AP 103 depicted in FIG. 3 is local-controller-managed using, for example a flag, text and the like. Alternatively, APs 103-2, 103-3 can store address 341 in memory 322 but be local-controller-managed, as indicated using a flag, text and the like in data 340.

As described above, memory 322 further stores an application 336. When application 336 is executed by processor 320, processor 320 is enabled to: transmit, to other APs 103, data 340 which can include, but is not limited to, address 341. Data 340 can transmitted in response to a request by another AP 103, 107 requesting data 340, and/or data 340 can be passively transmitted in one or more of a broadcast and a multicast (e.g. without receiving a request for data 340).

In other words, each AP 103 is generally configured to share, with other APs 103, including new AP 107, whether it is managed using a cloud controller or a local controller; in some implementations, an AP 103 that is cloud-controller-managed can further share a network address of the cloud controller performing the managing, such as address 341 of cloud controller 101.

As depicted, memory 322 further stores one or more identifiers 380 which can be used to identify (and/or uniquely identify) AP 103 at least in space 105; one or more identifiers 380 can comprise one or more of a MAC (Media Access Control) address, an SSID (Service Set Identifier), a text identifier and the like. One or more of identifiers 380 can be broadcast in a beacon, and the like, by interface 324 to identify AP 103 to other APs 103 (including new AP 107) and/or to identify AP 103 to communication devices and/or mobile devices to initiate communication with AP 103. Alternatively, one or more identifiers 380 can be transmitted to neighboring APs 103 using wired communications, as described above. In particular non-limiting implementations, data broadcast in such a beacon can included an SSID. Each AP 103 in space 105 can comprise different one or more identifiers 380; put another way, each set of one or more identifiers 380 can be specific to a specific AP 103, such that devices and/or other APs 103, 107 receiving the data in the beacon can identify with which AP 103 they are communicating.

As depicted, processor 320 also connects to interface 324, which can be implemented as one or more radios and/or connectors and/or network adaptors, configured to communicate wired and/or wirelessly with one or more communication networks, including network 109, as well as communicate wired and/or wirelessly with one or more of cloud controller 101 and/or local controller 102, as well as other APs 103 (including new AP 107), and communication devices and/or mobile devices and the like. It will be appreciated that interface 324 is configured to correspond with network architecture that is used to implement one or more communication links 110, 112, 113, as well as communication links to network 109 and communication links to communication devices and/or mobile devices. Such network architecture can include, but is not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

In particular, however, each AP 103 can comprise a WiFi AP, and hence interface 324 can be configured to correspond with network architecture that is used to implement a WiFi network and/or WiFi communication link.

While not depicted, AP 103 further comprises a power supply, including, but not limited to, a connection to a mains power supply and/or a power adaptor (e.g. and AC-to-DC (alternating current to direct current) adaptor), and alternatively a battery, a power pack and the like. In general the power supply powers components of AP 103.

Hence, it should be understood that in general a wide variety of configurations for each AP 103 are contemplated and each AP 103 can include other components, including, but not limited to, a speaker, a microphone and the like.

Figure 4:
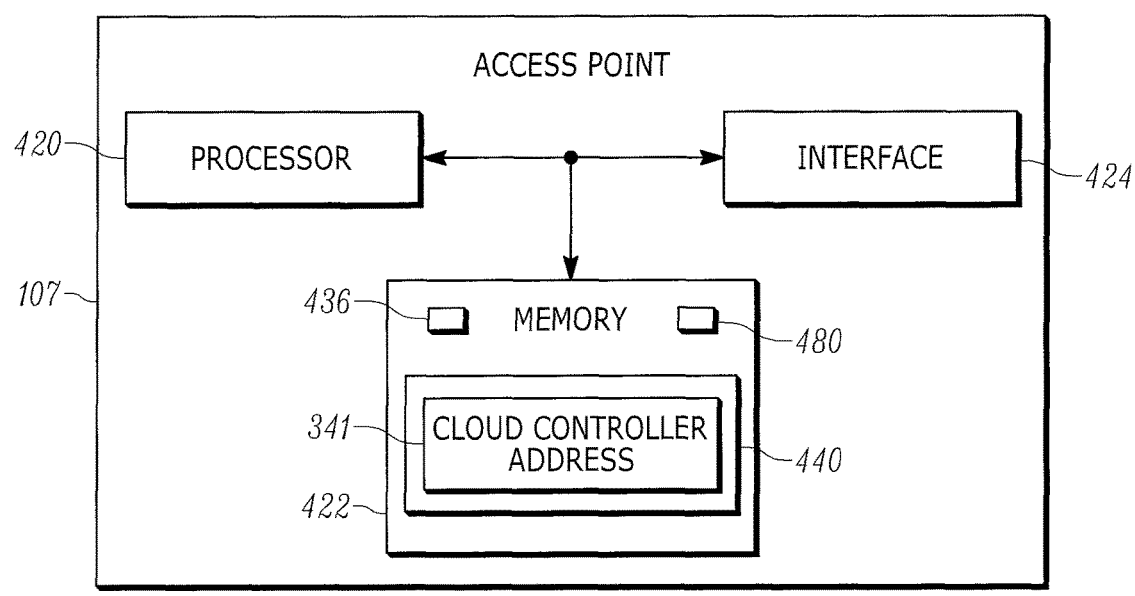
FIG. 4 depicts a schematic diagram of a new access point to be deployed in the system of FIG. 1, according to non-limiting implementations.

Attention is next directed to FIG. 4 which depicts a schematic diagram of a new AP 107 being deployed in space 105. New AP 107 is substantially similar to AP 103 depicted in FIG. 3, with like components having like numbers, however in a "400" series rather than a "300" series. Hence, AP 107 comprises: a processor 420; a memory 422; and a communication interface 424 (interchangeably referred to hereafter as interface 424). Each of processor 420, memory 422 and communication interface 424 is generally similar, respectively, to processor 420, memory 422 and interface 424, though initially AP 107 is not specifically configured to be cloud-controller-managed or local-controller-managed.

However, memory 422 generally stores an application 436 that, when processed by processor 420, enables processor 420 to: receive, using communication interface 424, data 440 indicative of whether each of other APs 103 are managed using a cloud controller or a local controller; when data 440 is indicative that at least one of other APs 103 is managed using cloud controller 101, cause AP 107 to be cloud-controller-managed; and, when data 440 is indicative that none of other APs 103 is managed using cloud controller 101, and when data 440 is further indicative that at least one of other APs 103 is managed using local controller 102, cause AP 107 to be local-controller-managed.

Application 436 can be further configured to enable processor 420 to perform generic functionality of an access point and/or a WiFi access point, as described above with respect to APs 103.

In other words, programming instructions that implement the functional teachings of AP 107 as described herein are typically maintained, persistently, in memory 422 and used by processor 420 which makes appropriate utilization of volatile storage during the execution of such programming instructions. Those skilled in the art recognize that memory 422 is an example of computer readable media that can store programming instructions executable on processor 420. Furthermore, memory 422 is also an example of a memory unit and/or memory module and/or a non-volatile memory.

As depicted, memory 422 can be further configured with address 341 of cloud controller 101, for example at a factory and/or in a provisioning process, and the like.

Further, memory 422 can store one or more identifiers 480, similar to one or more identifiers 380, one or more identifiers 480 being specific to AP 107.

In some implementations, APs 103 and AP 107 (once deployed) can form a local network at space 105, for example a WiFi network and/or a WLAN (wireless local area) network, and the like in space 105; hence, space 105 can comprise one or more of a warehouse, a factory, an office space, a living space, a public space and/or any space where APs 103, 107 can be deployed.

Figure 5:
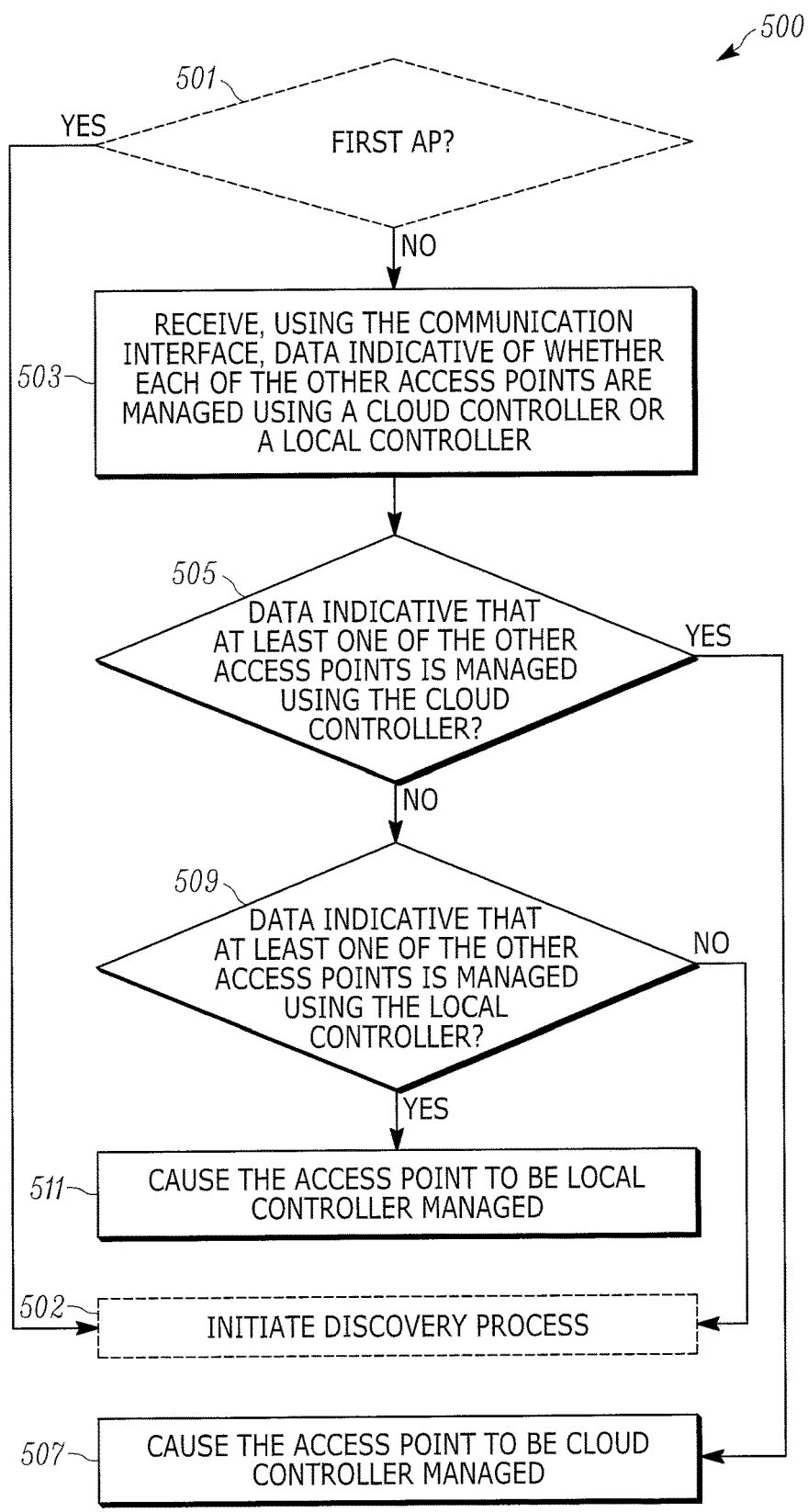
FIG. 5 depicts a block diagram of a flowchart of a method for configuring an access point in the system of FIG. 1, according to non-limiting implementations.

Attention is now directed to FIG. 5 which depicts a block diagram of a flowchart of a method 500 for configuring an access point, according to non-limiting implementations. In order to assist in the explanation of method 500, it will be assumed that method 500 is performed using new AP 107, and specifically by processor 420 at AP 107, when processor 420 processes instructions stored at memory 422, for example application 436. Indeed, method 500 is one way in which AP 107 can be configured. Furthermore, the following discussion of method 500 will lead to a further understanding of AP 107, and its various components. However, it is to be understood that AP 107 and/or method 500 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of AP 107 as well.

Furthermore, certain aspects of method 501 will be described with respect to an optional DHCP server that can be present in system 100; in implementations of system 100 that include a DHCP server, such a DHCP server can be one or more of local to APs 103, 107, in wired and/or wireless communication with one or more of APs 103, 107, and located in the "cloud" (e.g. in communication with network 109 at a location remote from APs 103, 107).

At an optional block 501 (such optionality indicated by virtue of block 501 being depicted in broken lines), processor 420 determines whether AP 107 is the first AP in a network. For example, AP 107 can determine whether AP 107 is in communication with any other APs 103; when AP 107 is the first access AP, (a "Yes" decision at block 501), processor 420 initiates a discovery process at block 502, described in more detail below with respect to FIG. 12 and FIG. 13.

However, when AP 107 is not the first access AP, (a "No" decision at block 501), at block 503, processor 420 receives, using communication interface 424, data 340 indicative of whether each of other APs 103 are managed using a cloud controller or a local controller. Data 340 can be received from other APs 103. Alternatively, data 340 can be received from cloud controller 101 and/or a DHCP server assuming that each AP 103 is registered with cloud controller 101 and/or a DHCP server regardless of whether each AP 103 is cloud-controller-managed or local-controller-managed. Alternatively, block 501 is not implemented, and processor 420 implements block 503 when data 340 is received from other APs 103.

At block 505, processor 420 determines whether data 340 is indicative that at least one of other APs 103 is managed using cloud controller 101, for example by processing data 340 to determine whether data 340 comprises a flag, text and the like indicating cloud controller management or local controller management at each AP 103 from which data 340 is received, and/or by determining whether data 340 comprises address 341 of cloud controller 101.

When data 340 is indicative that at least one of other APs 103 is managed using cloud controller 101, (a "Yes" decision at block 505), at block 507, processor 420 causes AP 107 to be cloud-controller-managed, for example by: using communication interface 424 to communicate with cloud controller 101; and receiving management parameters from cloud controller 101. When block 507 is implemented, method 500 can end.

However, returning to block 505, when data 340 is indicative that at least one of other APs 103 is managed using cloud controller 101 (a "Yes" decision at block 505), at block 507, processor 420 causes AP 107 to be cloud-controller-managed, for example by: using communication interface 424 to communicate with cloud controller 101 using network address 341. Specifically, processor 420 can cause AP 107 to be cloud-controller-managed, for example by: using communication interface 424 to communicate with cloud controller 101; and receiving management parameters from cloud controller 101. As described above, network address 341 can be provisioned at memory 422 and/or received in data 340. When block 507 is implemented, method 500 can end.

However, returning to block 505, when data 340 is indicative that none of other APs 103 is managed using cloud controller 101 (a "No" decision at block 505), at block 509 processor 420 determines whether data 340 is further indicative that at least one of other APs 103 is managed using local controller 102.

When data 340 is further indicative that at least one of other APs 103 is managed using local controller 102 (a "Yes" decision at block 509), at block 511, processor 420 causes AP 107 to be local-controller-managed for example by: using communication interface 424 to communicate with a respective local controller in communication with communication interface 424; and receiving management parameters from the respective local controller. In some implementations, the respective local controller can comprise local controller 102, while in other implementations, the respective local controller can comprise another local controller deployed at space 105 and connected to new AP 107, in a wired and/or wireless manner as desired. When block 511 is implemented, method 500 can end.

Returning to block 509, when data 340 is further indicative that at least one of other APs 103 is not managed using local controller 102 (a "No" decision at block 509), at block 502, processor 420 can initiate the discovery process, described in more detail below with respect to FIGS. 12 and 13; alternatively, method 500 can end and AP 107 can be manually configured. A "No" decision can occur at each of blocks 505, 509, for example, when each of other APs 103 is a stand-alone access point that is not centrally managed and the like, and/or each of other APs 103 is in a stand-alone mode. Alternatively, rather than implement block 502, AP 107 can also enter a stand-alone mode.

Method 500 will now be described with respect to FIGS. 6, 8, 9 and 11, each being substantially similar to FIG. 1, with like elements having like numbers except where otherwise indicated, and further described with respect to FIGS. 7 and 10, each being substantially similar to FIG. 3, with like elements having like numbers.

Figure 6:
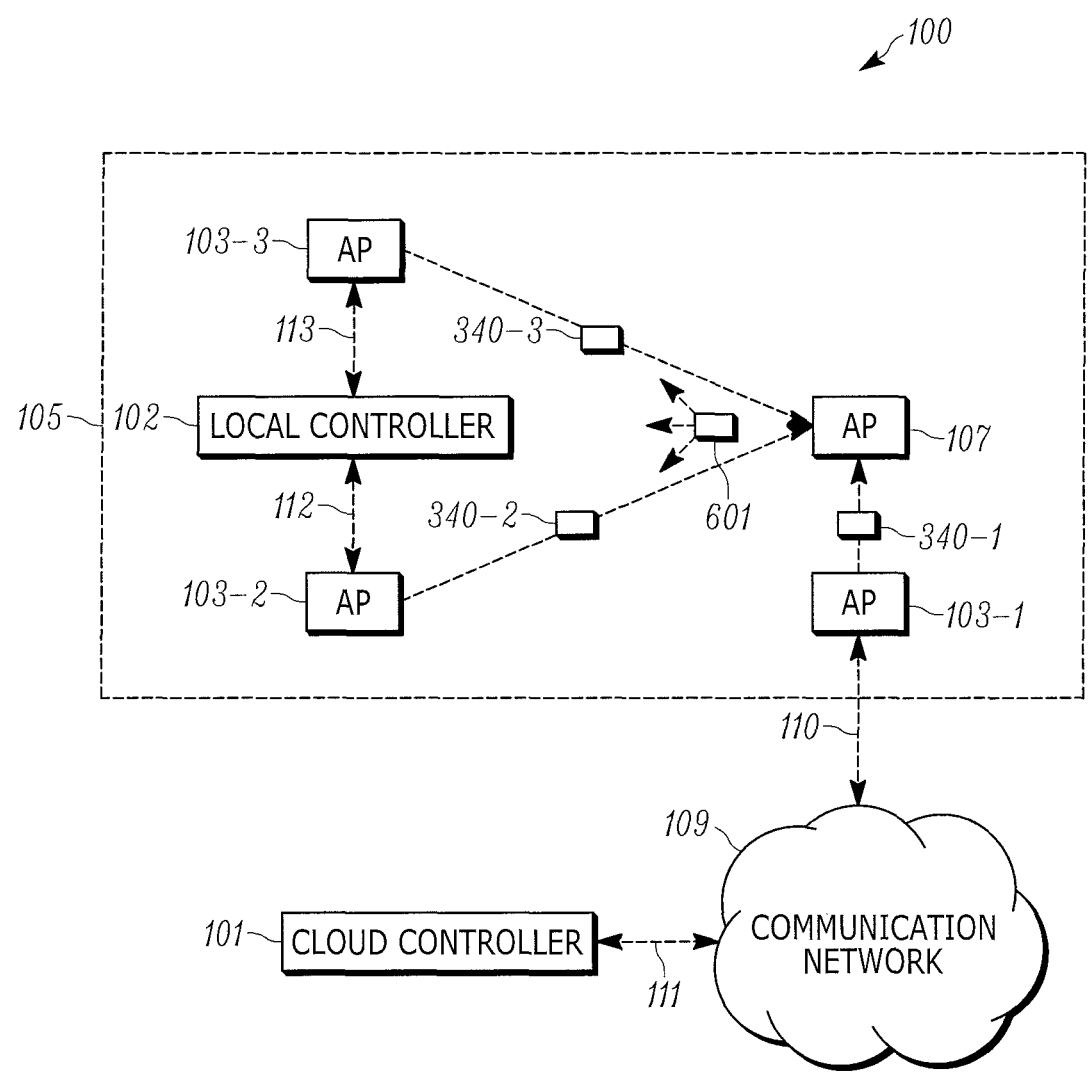
FIG. 6 depicts a new access point of the system of FIG. 1 receiving data from the other access points, the data indicating whether each of the other access points are local-controller-managed or cloud-controller-managed, according to non-limiting implementations.

In FIG. 6, it is assumed that processor 420 of AP 107 has either implemented block 501, and determined that AP 107 is not the first AP, or that processor 420 has skipped and/or not implemented block 501. In particular, FIG. 6 depicts a non-limiting implementation of block 503 in which processor 420 of AP 107 receives data 340-1, 340-2, 340-3 (collectively referred to as data 340), respectively, from other APs 103-1, 103-2, 103-3, each set of data 340-1, 340-2, 340-3 respectively indicative of whether a respective AP 103 is cloud-controller-managed or local-controller-managed. In some implementations, as depicted, AP 107 receives data 340 from each AP 103 by: transmitting a request 601 for data 340 to other APs 103, and receiving data 340 from other APs 103 in response to request 601. Request 601 can be broadcast and/or multicast in space 105 by AP 107, to other APs 103 and/or request 601 can be transmitted using a wired or wireless link, when present, to neighboring APs 103, which can, in turn, transmit request 601 to respective neighboring APs 103, as described above.

Alternatively, AP 107 does not transmit request 601; rather, processor 420 and AP 107 passively receives data 340 as one or more of a broadcast and a multicast from other APs 103. For example, data 340 can be broadcast and/or multicast in a beacon that further comprises one or more identifiers 380 and/or data 340 can be transmitted from a given AP 103, using a wired or wireless link, when present, to neighboring APs 103, 107, as described above.

Alternatively, AP 107 can requests and/or receive data 340 from cloud controller 101 and/or a DHCP server (which can be local to APs 103, 107 and/or in the cloud), assuming that each AP 103 is registered with cloud controller 101 and/or a DHCP server regardless of whether each AP 103 is cloud-controller-managed or local-controller-managed, for example in a user-controlled registration process and/or an automatic registration process.

It is assumed in FIG. 6 that each of request 601 and data 340 is transmitted wirelessly, the transmission of request 601 and data 340 between APs 103, 107 indicated by broken lines with arrows. However, as described above, request 601 can be distributed between neighboring APs 103, 107 using wired and/or wireless links.

Furthermore, in some implementations, data (including data 340) exchanged between APs 103, 107 in beacons (and/or in wired and/or wireless links) and the like can occur according to LLDP (link layer discovery protocol).

Figure 7:
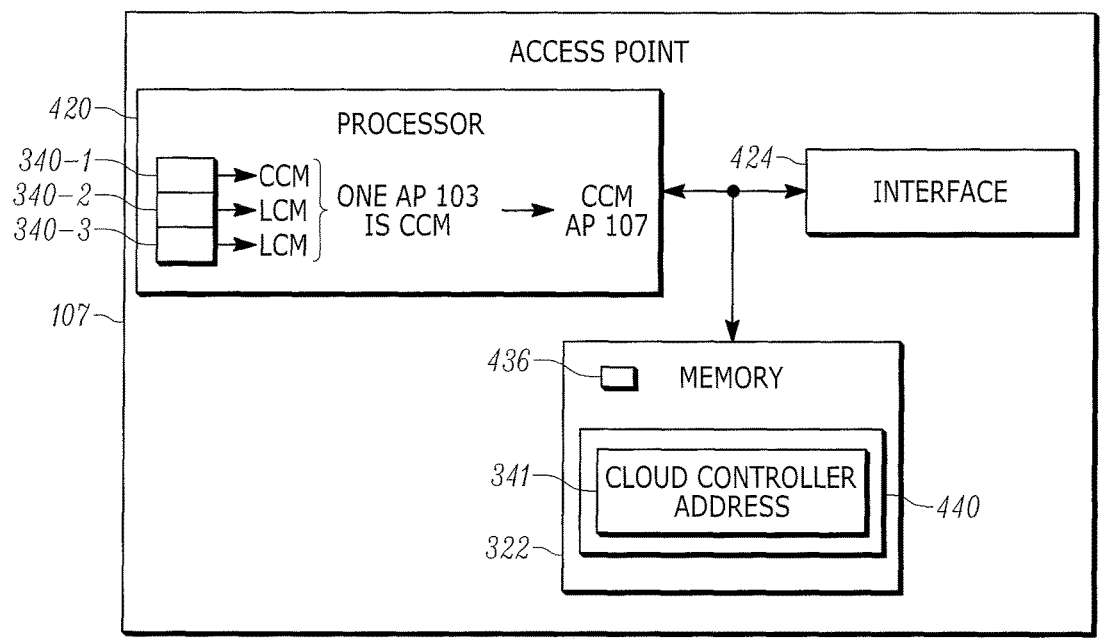
FIG. 7 depicts the new access point of the system of FIG. 1 being configured as cloud-controller-managed when at least one other access point is cloud-controller-managed, according to non-limiting implementations.

Attention is next directed to FIG. 7, which depicts a non-limiting implementation of blocks 505, 507. In particular, it is assumed that processor 420 has received data 340, and is processing data 340 to determine whether at least one of other APs 103 is cloud-controller-managed. In particular, each of data 340-2, 340-3 is indicative that associated APs 103-2, 103-3 are each local-controller-managed (e.g., data 340-2, 340-3 can each comprise text "LCM"); for example, each of data 340-2, 340-3 can comprise a flag, text, and the like indicative that associated APs 103-2, 103-3 are each local-controller-managed ("LCM"). Similarly, data 340-1 is indicative that associated access point 103-1 is cloud-controller-managed (data 340-1 can comprise text "CCM"); for example, data 340-1, can comprise a flag, text, address 341 and the like indicative that associated AP 103-1 is cloud-controller-managed ("CCM").

Hence, processor 420 determines, at block 505, that at least one of other APs 103 is managed using cloud controller 101, and hence, at block 507, processor 420 causes AP 107 to be cloud-controller-managed.

Indeed, as further depicted in FIG. 7, when data 340 is indicative that at least one of the other APs 103 (e.g. AP 103-1) is managed using cloud controller 101, and when data 340 is further indicative that others of other APs 103 (e.g. APs 103-2, 103-3) are managed using local controller 102, processor 420 causes AP 107 to be cloud-controller-managed. In other words, only one other AP 103 being cloud-controller-managed causes new AP 107 also to be cloud-controller-managed; indeed, only one other AP 103 being cloud-controller-managed indicates that space 105 is being changed and/or updated and/or configured for cloud controller management, and any new access points, such as AP 107, should also be cloud-controller-managed.

Figure 8:
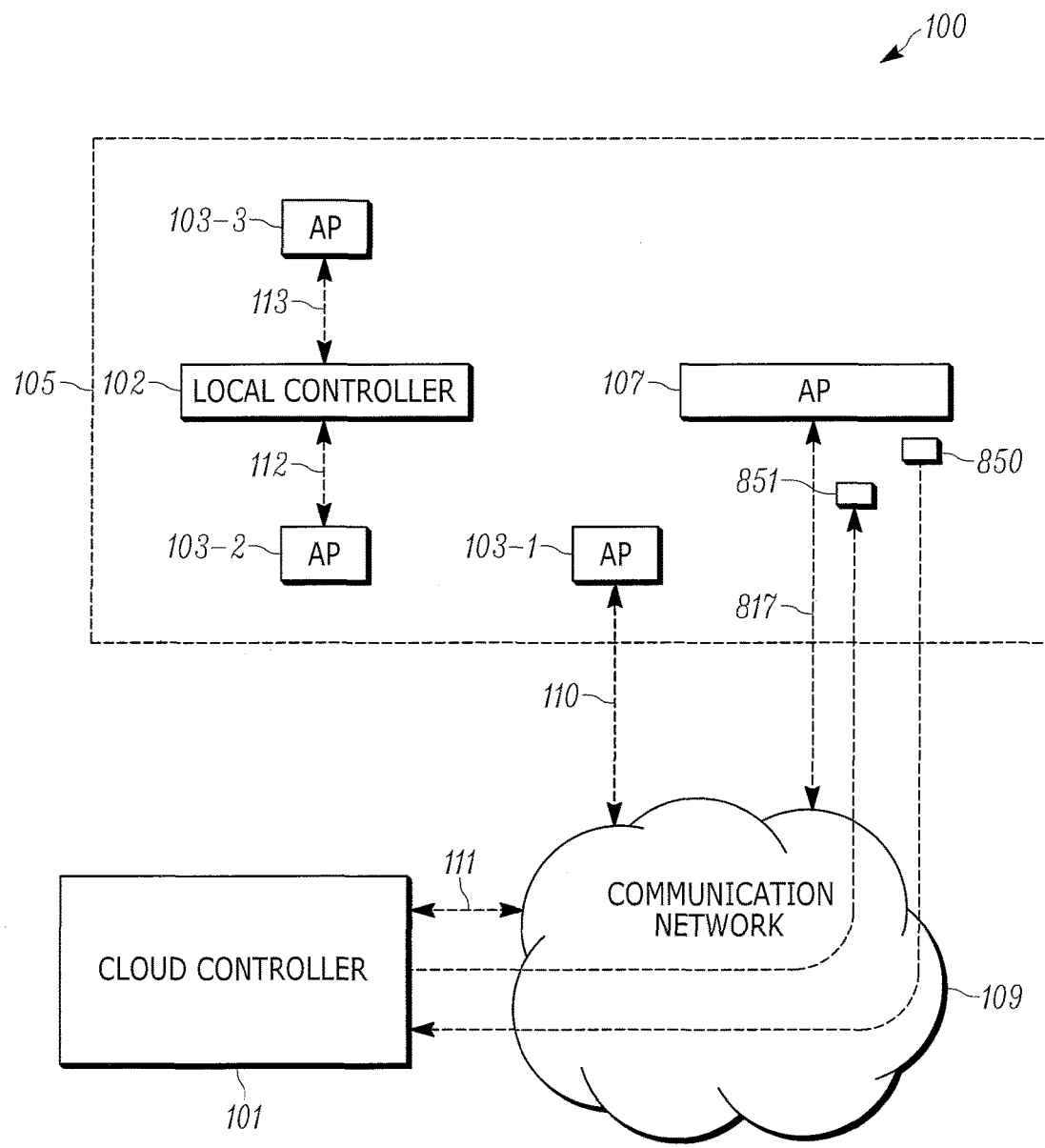
FIG. 8 depicts the new access point of the system of FIG. 1 receiving management parameters from a cloud controller when it is determined that the new access point is to be cloud-controller-managed, according to non-limiting implementations.

For example, with reference to FIG. 8, once processor 420 determines that AP 107 is to be cloud-controller-managed, processor 420 can establish a link 817 (which is substantially similar to link 110), and use cloud controller address 341 to communicate with cloud controller 101 to one or more of register with cloud controller 101, and/or transmit a request 850 to cloud controller 101 for management parameters 851. Either way, cloud controller 101 can transmit management parameters 851 to AP 107, which receives management parameters 851 from cloud controller 101; such management parameters 851 can be processed by processor 420 to configure AP 107. Such management parameters 851 can include, but are not limited to, an IP address of AP 107 assigned thereto by cloud controller 101.

In some implementations, management parameters 851 can be transmitted to an AP 103 by cloud controller 101 (including, but not limited to, AP 103-1, which is cloud-controller-managed), and the AP 103 which receives management parameters 851 can, in turn, transmit management parameters 851 to neighboring APs 103 using wired and/or wireless links, which can, in turn, transmit management parameters 851 to neighboring APs 103 until AP 107 receives management parameters 851, as described above.

As described above, network address 341 can be received in data 340-1 such that AP 107 registers with same cloud controller 101 that controls associated AP 103-1; and/or network address 341 can be provisioned at memory 322.

Figure 9:
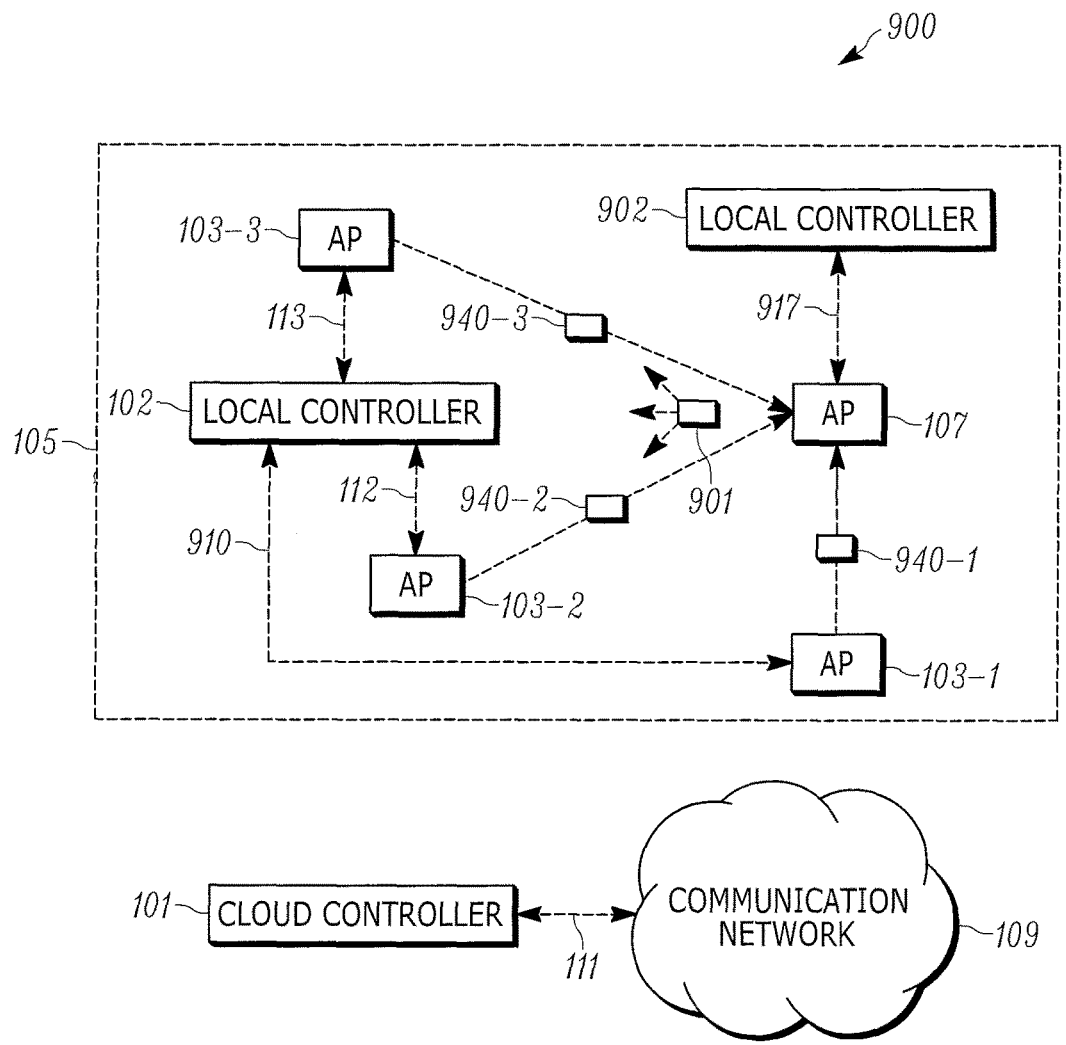
FIG. 9 depicts a schematic diagram of an alternative system for configuring an access point, when none of other access points are cloud-controller-managed, according to non-limiting implementations.

Attention is next directed to FIG. 9, which depicts a schematic diagram of an alternative system 900 configured for configuring an access point. System 900 is substantially similar to system 100 with like elements having like numbers; however, in system 900, all of APs 103 (including AP 103-1) are controlled by local controller 102. For example, AP 103-1 is in communication with local controller 102 via a link 910 which is substantially similar to links 112, 113. Furthermore, new AP 107 has been placed in space 107 and connected to a respective local controller 902 via a link 917 which is substantially similar to links 112, 113. Respective local controller 902 can be similar to local controller 102; indeed, in some implementations, local controller 102 comprises respective local controller 902.

In any event, as in FIG. 6, it is assumed that processor 420 of AP 107 is implementing method 500, and further assumed that processor 420 of AP 107 has either implemented block 501, and determined that AP 107 is not the first AP, or that processor 420 has skipped and/or not implemented block 501. In particular, in FIG. 9 depicts a non-limiting implementation of block 503 in which processor 420 of AP 107 receives data 940-1, 940-2, 940-3 (collectively referred to as data 940), respectively, from other APs 103-1, 103-2, 103-3, each set of data 940-1, 940-2, 940-3 respectively indicative of whether a respective AP 103 is cloud-controller-managed or local-controller-managed. In other words, data 940 is similar to data 340.

In some implementations, as depicted, AP 107 receives data 940 from each AP 103 by: transmitting a request 901 for data 940 to other APs 103 (request 901 similar to request 601), and receiving data 940 from other APs 103 in response to request 901. Request 901 can be broadcast and/or multicast in space 105 by AP 107, to other APs 103.

Alternatively, AP 107 does not transmit request 901; rather, processor 420 and AP 107 passively receives data 940 as one or more of a broadcast and a multicast from other APs 103. For example, data 940 can be broadcast and/or multicast in a beacon (and/or in wired and/or wireless links) that further comprises one or more identifiers 380.

It is assumed in FIG. 9 that each of request 901 and data 940 is transmitted wirelessly, the transmission of request 901 and data 940 between APs 103, 107 indicated by broken lines with arrows. However, as described above, request 901 and data 940 can be distributed between neighboring APs 103,107 using wired and/or wireless links.

Figure 10:
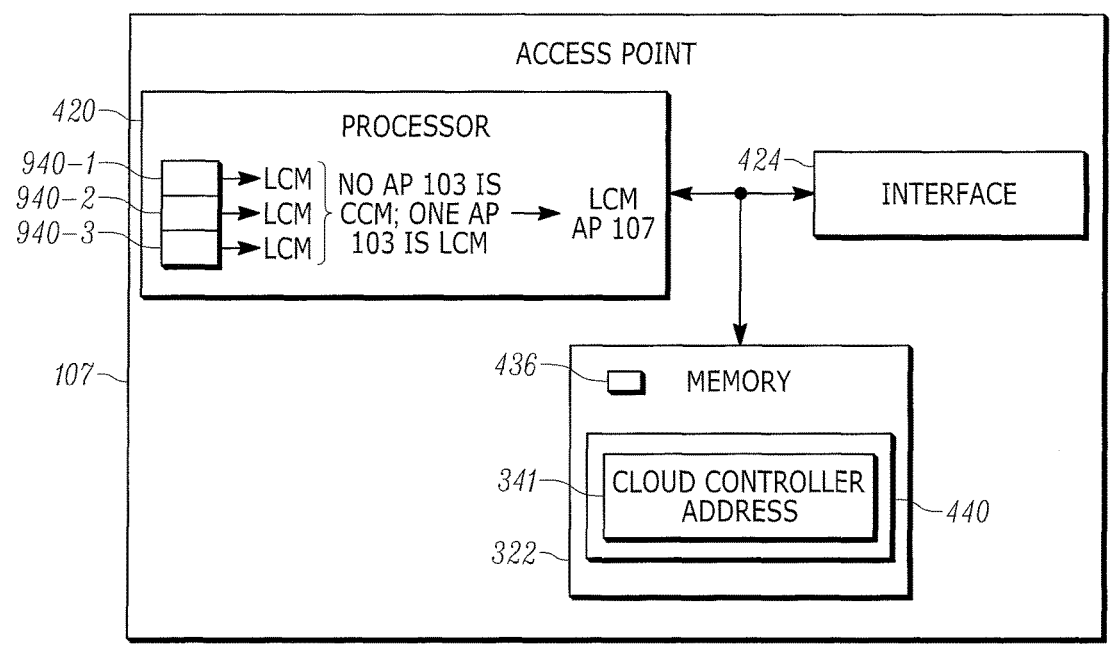
FIG. 10 depicts a new access point of the system of FIG. 9 being configured as local-controller-managed when none of the other access point is cloud-controller-managed, according to non-limiting implementations.

Attention is next directed to FIG. 10, which depicts a non-limiting implementation of blocks 505, 509, 511. In particular, it is assumed that processor 420 has received data 940, and is processing data 940 to determine whether none of other APs 103 is cloud-controller-managed. In particular, each of data 940-1, 940-2, 940-3 is indicative that associated APs 103-1, 103-2, 103-3 are each local-controller-managed ("LCM"); for example, each of data 940-1, 940-2, 940-3 can comprise a flag, text, and the like indicative that associated APs 103-1, 103-2, 103-3 are each local-controller-managed ("LCM"). None of data 940 indicates that any of APs 103 are cloud-controller-managed.

Hence, processor 420 determines, at block 505, none of other APs 103 is managed using cloud controller 101. Hence, processor 420 determines, at block 509, at least one of other APs 103 is managed using local controller 102 and at block 511, processor 420 causes AP 107 to be local-controller-managed.

In other words, as none of other APs 103 is cloud-controller-managed, neither is new AP 107.

Figure 11:
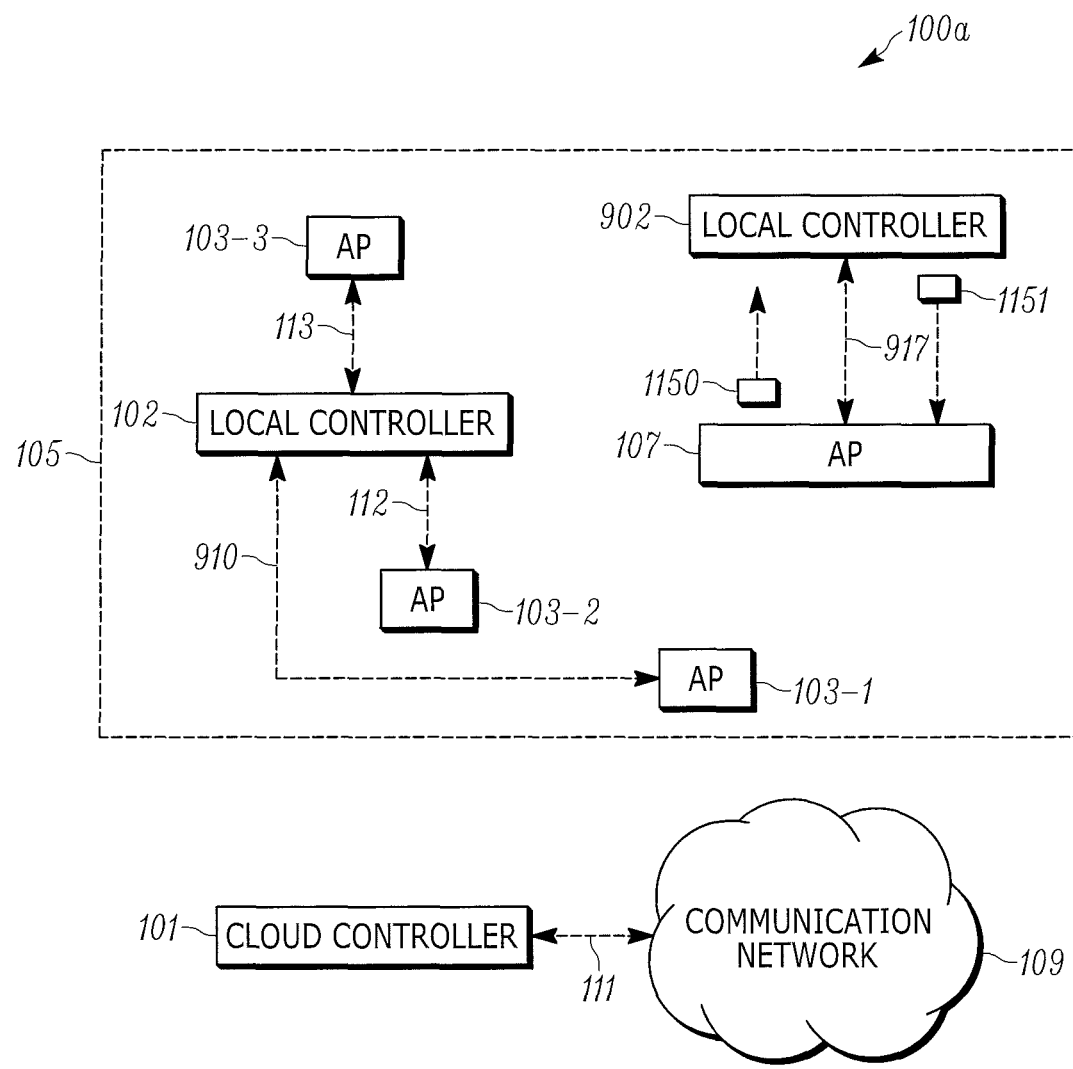
FIG. 11 depicts the new access point of the system of FIG. 9 receiving management parameters from a respective local controller when it is determined that the new access point is to be local-controller-managed, according to non-limiting implementations.

With reference to FIG. 11, once processor 420 determines that AP 107 is to be local-controller-managed, processor 420 can transmit a request 1150 to local controller 102 for management parameters 1151 using link 917. Either way, local controller 102 can transmit management parameters 1151 to AP 107, which receives management parameters 1151 from local controller 102; such management parameters 1151 can be processed by processor 420 to configure AP 107. In implementations where link 917 has not yet been established (e.g. AP 107 cannot communicate with a local controller), and AP 107 can either: enter a discovery mode; enter a waiting mode where AP 107 attempts to find a local controller; and/or, when cloud controller address 341 is stored in memory 422, attempt to establish communication with cloud controller 101 to become cloud-controller-managed. In these latter implementations, it is assumed that cloud controller address 341 has been provisioned at memory 422 at a factory and/or in a provisioning process, and the like.

Figure 12:
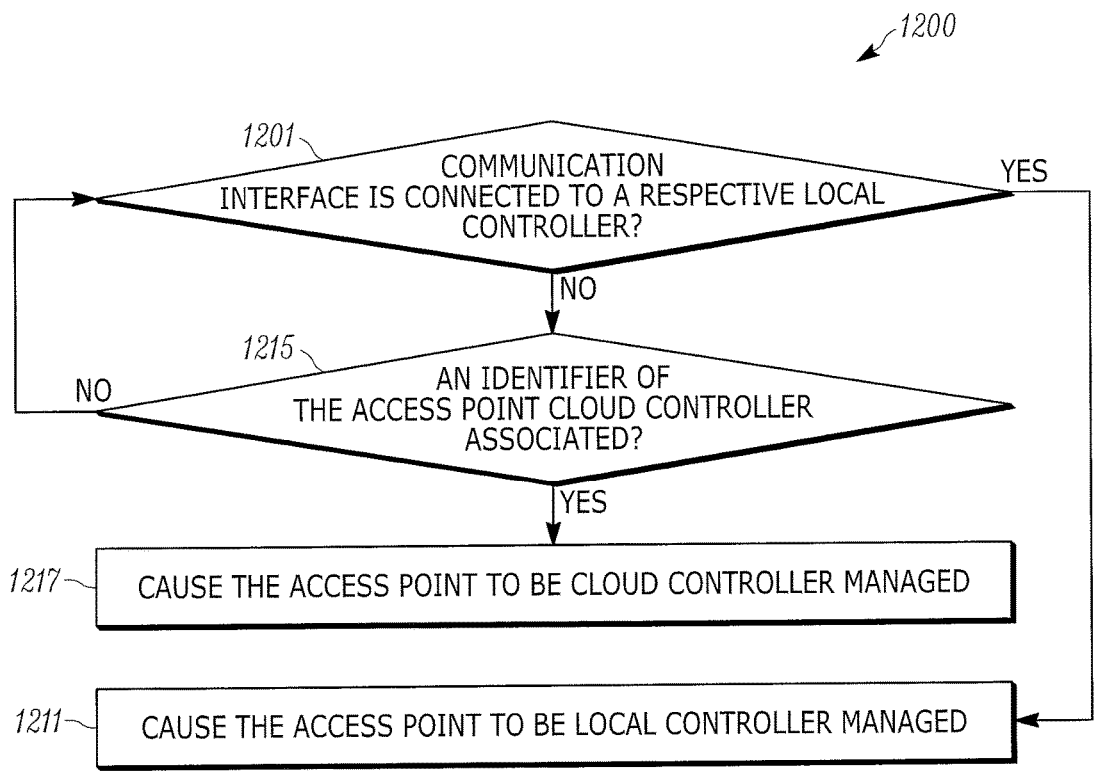
FIG. 12 depicts a block diagram of a flowchart of a method for configuring an access point using a discovery process, according to non-limiting implementations.

Attention is now directed to FIG. 12 which depicts a block diagram of a flowchart of a method 1200 for configuring an access point using a discovery process, according to non-limiting implementations. In order to assist in the explanation of method 1200, it will be assumed that method 1200 is performed using new AP 107, and specifically by processor 420 at AP 107, when processor 420 processes instructions stored at memory 422, for example application 436. Indeed, method 1200 is one way in which AP 107 can be configured. Furthermore, the following discussion of method 1200 will lead to a further understanding of AP 107, and its various components. However, it is to be understood that AP 107 and/or method 1200 can be varied, and need not work exactly as discussed herein in conjunction with each other, and that such variations are within the scope of present implementations.

Regardless, it is to be emphasized, that method 1200 need not be performed in the exact sequence as shown, unless otherwise indicated; and likewise various blocks may be performed in parallel rather than in sequence; hence the elements of method 1200 are referred to herein as "blocks" rather than "steps". It is also to be understood, however, that method 1200 can be implemented on variations of AP 107 as well.

It is assumed in method 1200 that processor 420 has determined that block 502 of method 500 is to be implemented. Indeed, method 1200 comprises a particular non-limiting implementation of block 502 of method 500. In particular, method 1200 can be implemented when processor 420 determines, at block 501, that AP 107 is a first access point in a network; or method 1200 can be implemented when processor 420 determines, at blocks 505, 509 that data 340 (and/or data 940) is indicative that none of other APs 103 is managed using cloud controller 101, and that data 340 (and/or data 940) is further indicative that none of other APs 103 is managed using local controller 102. Such a condition can occur when each of other APs 103 is a stand-alone access point that is not centrally managed and the like, and/or each of other APs 103 is in a stand-alone mode.

In any event, when either a "Yes" decision occurs at block 501, or a "No" decision occurs at each of blocks 505, 509, processor 420 an initiate a discovery process, at block 502, to determine whether to cause AP 107 to be cloud-controller-managed or local-controller-managed.

At block 1201, processor 420 determines whether communication interface 424 is connected to a respective local controller (e.g. as depicted in system 900 of FIG. 9). When communication interface 424 is connected to a respective local controller (e.g. a "Yes" decision at block 1201), at block 1211, processor 420 causes AP 107 to be local-controller-managed. Block 1211 is substantially similar to block 511, and communication with a respective local controller can be substantially similar to that described with reference to FIG. 11.

However, when communication interface 424 is not connected to the respective local controller (e.g. a "No" decision at block 1201), at block 1215 processor 420 determines, using communication interface 424, whether an identifier 480 of AP 107 has been cloud controller associated; such implementations are described below with respect to FIG. 13. When identifier 480 has been cloud controller associated (e.g. a "Yes" decision at block 1215), at block 1217, processor 420 causes AP 107 to be cloud-controller-managed. Block 1217 is substantially similar to block 507, and communication with a cloud controller can be substantially similar to that described with reference to FIG. 8.

However, when communication interface 424 is not connected to the respective local controller (e.g. a "No" decision at block 1201) and when identifier 480 has not been cloud controller associated (e.g. a "No" decision at block 1215), processor 420 repeats the discovery process until one of communication interface 424 is connected to the respective local controller (e.g. a "Yes" decision occurs at block 1201) and identifier 480 has been cloud controller associated (e.g. a "Yes" decision occurs at block 1215).

Alternatively, new AP 107 can attempt to implement block 1201 for a given number of times to connect to a respective local controller before attempting to implement block 1215 (e.g. processor 420 can achieve a given number of "No" decisions prior to implementing block 1215 assuming a "Yes" decision does not occur).

Figure 13:
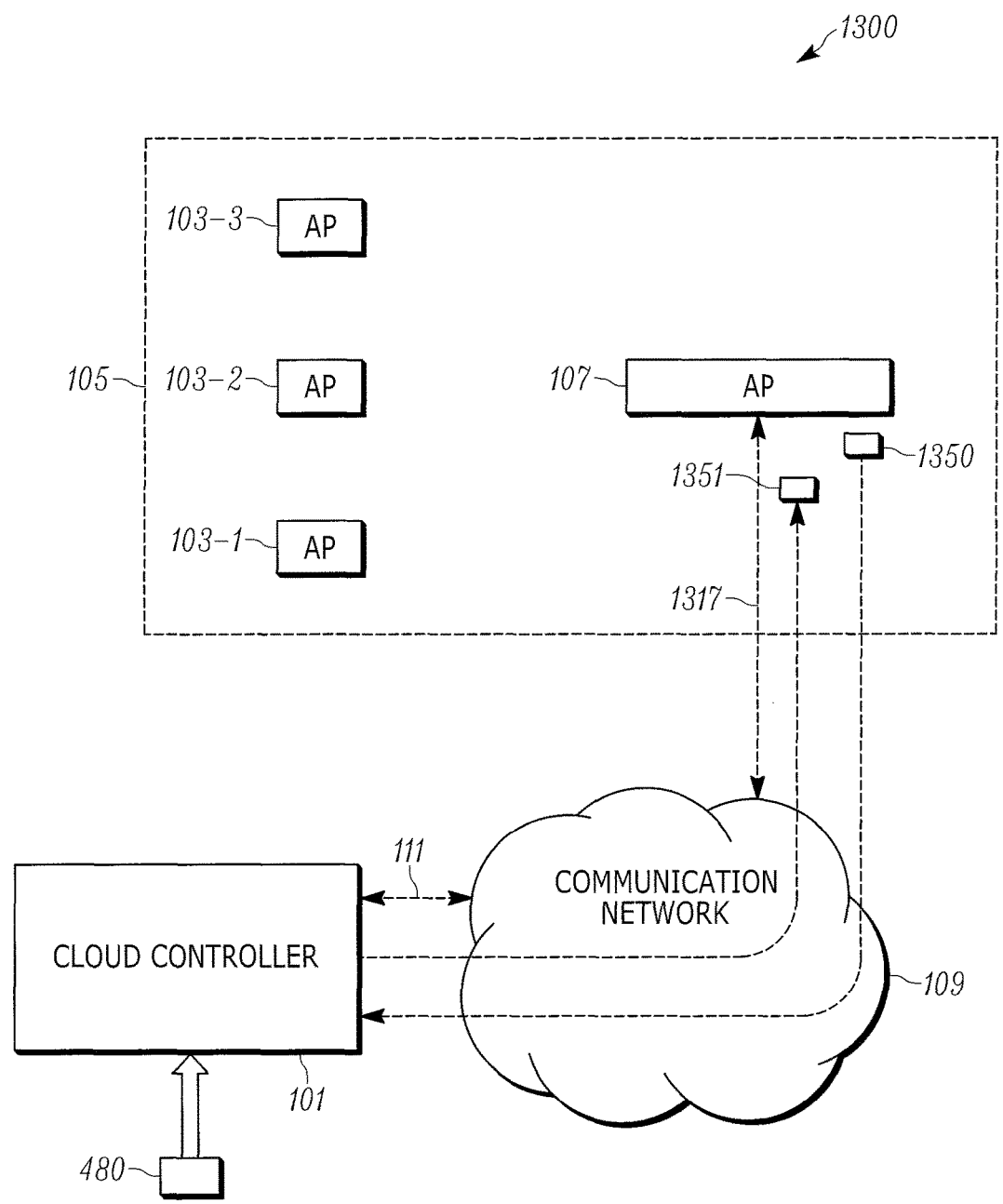
FIG. 13 depicts a schematic diagram of an alternative system for configuring an access point, when none of other access points are cloud-controller-managed or local-controller-managed, according to non-limiting implementations.

Attention is next directed to FIG. 13, which depicts a schematic diagram of an alternative system 1300 for configuring an access point. System 1300 is substantially similar to system 100 with like elements having like numbers, however in system 1300 none of APs 103 are managed by either a cloud controller or a local controller; indeed, as depicted, system 1300 does not include a local controller. In particular, in FIG. 13, it is assumed that cloud controller address 341 has been provisioned at AP 107 such that AP 107 can communicate with cloud controller 101 without receiving any data from other APs 103.

Furthermore, system 1300 depicts a non-limiting implementation of block 1215 of method 1200, in which processor 420 of AP 107 is determining whether one or more identifiers 480 of AP 107 has been cloud controller associated.

For example, further depicted in FIG. 13 is a provisioning process in which cloud controller 101 receives one or more identifiers 480 of AP 107, for example using interface 224 and/or input device 228. In other words, one or more identifiers 480 of AP 107 are registered at cloud controller 101 and stored in memory 222 as an identifier of an AP that cloud controller 101 is to manage. Hence, when processor 420 is implementing block 1215, processor 420 and/or AP 107 can establish a link 1317 with network 109 (link 1317 being substantially similar to link 817) and transmit a request 1350 to cloud controller 101 for management parameters 1351. Request 1350 can include one or more identifiers 480 stored at memory 422 such that cloud controller 101 can compare identifiers received in request 1350 with identifiers stored in memory 422. Presuming that cloud controller 101 has received one or more identifiers 480, as depicted in FIG. 13, cloud controller 101 transmits management parameters 1351 to AP 107 to cause AP 107 to be cloud-controller-managed; in other words, receipt of management parameters 1351 at AP 107 can result in a "Yes" decision at block 1215, thereby causing AP 107 to be cloud-controller-managed.

However, when cloud controller 101 has received one or more identifiers 480, cloud controller 101 can alternatively transmit a denial for request 1350, which, when received at AP 107, which can result in a "No" decision at block 1215, thereby causing method 1200 to repeat.

In other words, according to the discovery process in method 1200, when AP 107 determines that it is connected to a local controller, AP 107 is caused to become local-controller-managed. However, when no local controller is found, AP 107 attempts to contact a cloud controller using an address provisioned in memory 422. When AP 107 is not registered at the cloud controller, AP 107 again attempts to determine whether a local controller has been connected, and again attempts to determine whether AP 107 has been registered at a cloud controller. Such repeating allows a user setting up AP 107 time to either connect a local controller thereto or to register AP 107 with a cloud controller. In some implementations, however, after a given number of attempts to connect to a local controller and/or to determine whether AP 107 has been registered at a cloud controller, AP 107 can enter a stand-alone mode.

In the foregoing specification, specific implementations have been described. However, one of ordinary skill in the art appreciates that various modifications and changes can be made without departing from the scope of the specification. For example, in some implementations, all access points in systems described herein can be cloud enabled, and it can be challenging when these cloud enabled access points are deployed at a space 105, especially when space 105 comprises a site associated with an enterprise and/or business. For example, enterprise entities may prefer to restrict access points at their site from contacting the cloud as such contact could potentially expose details of the access points. Manually configuring access points to mark them as cloud or non-cloud access points may not be a viable option as such manual configuring is time consuming.

Hence, methods and systems described herein can be modified to automatically configure an access point being cloud-controller-managed or local-controller-managed (or alternatively non-cloud-controller-managed); alternatively, methods and systems described herein can be modified to automatically enable or disable beaconing of a default SSID used for Over-The-Air (OTA) Activation of cloud-enabled APs. For example, when AP 107 contacts cloud controller 101 using request 850 and/or request 1350, management parameters 851, 1351 can include data for enabling AP 107 to include certain data in a beacon of AP 107, and/or data for disabling AP 107 from including certain data in a beacon of AP 107. Such data that can be included or excluded from the beacon can include a default SSID, used for Over-The-Air (OTA) Activation of AP 107, which can be stored as one or more identifiers 480. Thereafter, activation and/or registration of AP 107 with cloud controller 101 can end and AP 107 can default to either being local-controller-managed or entering a stand-alone mode.

For example, in such implementations, similar to the provisioning depicted in FIG. 13, cloud controller 101 can receive an identifier 480 of AP 107 with data indicative of whether AP 107 can be OTA activated; when AP 107 attempts to contact cloud controller 101 at block 507 of method 500 and/or at block 1217 of method 1200, receipt of management parameters 851, 1351 can cause AP 107 not to be cloud-controller-managed, but rather local-controller-managed (or cause AP 107 to enter a stand-alone mode).

Specific non-limiting implementations will be now be described assuming that system 100 includes at least one DHCP server, which can be local or remote from APs 103, 107 and/or located in the cloud, and/or cloud controller 101 can comprise a DHCP server.

In particular, at such a DHCP server, each access point that is to be deployed in space 105 can be registered therewith with data indicating whether each access points is be cloud enabled or disabled and/or indicating whether Over-The-Air (OTA) activation SSID is to be enabled or disables on each cloud enabled access point. In specific non-limiting implementations, DHCP option "191" can be used to push controller information to access point and/or a new option can be defined.

When each access point boots up, the access point can attempt to contact the DHCP server to, for example, retrieve an IP address from the DHCP server (e.g. using a request similar to requests 850, 1350).

However, when cloud access is disabled for the access point (e.g. in a DHCP option), then data is transmitted to the access point to indicate that the access point is be cloud disabled; once the access point is cloud disabled, it will no longer attempt to connecting to a cloud controller and/or a DHCP server.

However, when cloud access is enabled for the access point (e.g. in a DHCP option), then data is transmitted to the access point to indicate that the access point is be cloud enabled. Once the access point is cloud enabled, it will not try connecting to a local controller.

In other words, in these implementations, processor 420 of AP 107 can be further configured to: when AP 107 boots up, communicate with cloud controller 101; and receive initial data from cloud controller 101 indicating whether AP 107 is to be cloud-controller-managed or local-controller-managed the initial data superseding data 340, 940 indicative of whether each of other APs 103 are managed using the cloud controller or the local controller.

Hence, in these implementations, methods 500, 1200 can be modified to cause AP 107 to first attempt to contact cloud controller 101 using cloud controller address 341 provisioned at memory 422 (e.g. prior to implementation of block 501 and/or block 1201); whether or not remaining portions of methods 500, 1200 occur can depend on data received from cloud controller 101. When the data received from cloud controller 101 (prior to implementation of blocks 501, 1201) indicates that AP 107 is to be cloud-controller-managed, block 507 and/or block 1217 occurs independent of data received from other APs 103; the data received from cloud controller 101 (prior to implementation of blocks 501, 1201) indicates that AP 107 is to not be cloud-controller-managed, block 511 and/or block 1211 occurs independent of data received from other APs 103.

However, when the data and/or DHCP option received from cloud controller 101 and/or DHCP server does not indicate whether AP 107 is be cloud cloud-controller-managed or not, then method 500 and/or method 1200 can proceed as described above. In particular, when at block 505, new AP 107 determines that at least one other AP 103 is cloud-controller-managed, and hence also cloud enabled, at block 507 new AP 107 is also designated as cloud enabled. Similarly, when at block 509, new AP 107 determines that no other APs 103 are cloud-controller-managed, but are local-controller-managed, and hence also cloud disabled, at block 511 new AP 107 is also designated as cloud disabled.

In yet further implementations method 500 can be adapted to receive parameters for communicating with a local controller from other local-controller-managed APs 103, or via DHCP options (e.g. prior to being cloud disabled).

In yet further implementations, the discovery process of method 1200 can be adapted to designate new AP 107 as a master AP. As such, master AP 107 can be configured with a list of identifiers of neighboring APs 103 at space 105, received, for example, in respective beacons and/or from cloud controller 101 and/or from a DHCP server (e.g. identifiers of APs 103 can be registered with cloud controller 101 and/or at a DHCP server prior to neighboring APs 103 being placed in a standalone mode).

Furthermore, once method 1200 is implemented and master AP 107 is cloud-controller-managed, method 500 can be implemented at other APs 103 to also place other APs 103 into a cloud-controller-management mode; hence, by implementing method 500 at all APs 103, 107 in space 107, and by causing one AP 103, 107 in space 105 to be automatically cloud-controller-managed, all other APs 103, 107 can be automatically cloud-controller-managed. Similarly, once one AP 103, 107 is cloud-enabled, all other APs 103, 107 can be cloud-enabled. Hence, cloud controller management and/or cloud enablement of APs 103, 107 can be propagated to each of APs 103, 107.

Alternatively, one or more of system 100, 900, 1300 can be adapted to include another device (not depicted) that can enable cloud activation of all APs 103, 107. For example, a communication device and/or mobile device can be deployed and/or temporarily deployed in space 105 which can transmit data to one or more APs 103, 107 that triggers one or more APs 103, 107 that receive the data to become cloud-controller-managed and/or cloud enabled; method 500 can be implemented at other APs 103, 107 thereby cause each of the other APs 103, 107 to become cloud-controller-managed and/or cloud enabled.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

We claim:

1. An access point comprising:
 a communication interface configured to communicate with one or more other access points;
 a processor configured to:
  receive, using the communication interface, data indicative of whether each of the one or more other access points is managed using a cloud controller or a local controller;
  based on the data indicating that at least one of the one or more other access points is managed using the cloud controller, cause the access point to be cloud-controller-managed;
  based on the data indicating that the one or more other access points is not managed using the cloud controller and that at least one of the one or more other access points is managed using the local controller, cause the access point to be local-controller-managed; and
  based on the access point being a first access point in a network or the data indicating that the one or more other access points is not managed using the cloud controller or the local controller, initiate a discovery process to determine whether to cause the access point to be cloud-controller-managed or local-controller-managed.

2. The access point of claim 1, wherein the processor is further configured to:
 based on the data is indicative indicating that at least one of the one or more other access points is managed using the cloud controller and that at least one of the one or more other access points is managed using the local controller, cause the access point to be cloud-controller-managed.

3. The access point of claim 1, wherein the processor is further configured to:
 cause the access point to be cloud-controller-managed by:
  using the communication interface to communicate with the cloud controller; and
  receiving management parameters from the cloud controller.

4. The access point of claim 1, further comprising:
 a memory storing a network address of the cloud controller, wherein the processor is further configured to cause the access point to be cloud-controller-managed by using the communication interface to communicate with the cloud controller using the network address.

5. The access point of claim 1, wherein the data comprises a network address of the cloud controller and wherein the processor is further configured to cause the access point to be cloud-controller-managed by using the communication interface to communicate with the cloud controller using the network address received in the data.

6. The access point of claim 1, wherein the processor is further configured to:
 cause the access point to be local-controller-managed by:
  using the communication interface to communicate with a respective local controller in communication with the communication interface; and receiving management parameters from the respective local controller.

7. The access point of claim 1, wherein to receive the data from the one or more other access points, the processor is further configured to:
transmit a request for the data to the one or more other access points; and
receive the data from the one or more other access points in response to the request.

8. The access point of claim 1, wherein the discovery process comprises:
based on a connection between the communication interface and a respective local controller, causing the access point to be local-controller-managed;
based on the connection not being between the communication interface and the respective local controller:
determining, using the communication interface, whether an identifier of the access point has been cloud controller associated; and
based on the determining, causing the access point to be cloud-controller-managed.

9. The access point of claim 8, wherein the processor is further configured to:
based on the connection not being between the communication interface and the respective local controller and the determining, repeat the discovery process.

10. The access point of claim 1, wherein the processor is further configured to:
communicate with the cloud controller based on the access point booting up; and
receive initial data from the cloud controller, wherein the initial data indicates whether the access point is to be cloud-controller-managed or local-controller-managed, the initial data superseding the data indicative of whether each of the one or more other access points are managed using the cloud controller or the local controller.

11. A method performed by an access point, the method comprising:
receiving, at a processor of the access point, through a communication interface configured to communicate with one or more other access points, data indicative of whether each of the one or more other access points are managed using a cloud controller or a local controller;
based on the data indicating that at least one of the one or more other access points is managed using the cloud controller, causing, using the processor, the access point to be cloud-controller-managed;
based on the data indicating that none of the one or more other access points is managed using the cloud controller and that at least one of the one or more other access points is managed using the local controller, causing, using the processor, the access point to be local-controller-managed; and
based on the access point being a first access point in a network or the data indicating that the one or more other access points is not managed using the cloud controller or the local controller, initiate a discovery process to determine whether to cause the access point to be cloud-controller-managed or local-controller-managed.

12. The method of claim 11, further comprising:
based on the data indicating that at least one of the one or more other access points is managed using the cloud controller and that at least one of the one or more other access points is managed using the local controller, causing the access point to be cloud-controller-managed.

13. The method of claim 11, further comprising:
causing the access point to be cloud-controller-managed by:
using the communication interface to communicate with the cloud controller; and
receiving management parameters from the cloud controller.

14. The method of claim 11, wherein the access point further comprises a memory storing a network address of the cloud controller, and the method further comprises:
causing the access point to be cloud-controller-managed by using the communication interface to communicate with the cloud controller using the network address.

15. The method of claim 11, wherein the data comprises a network address of the cloud controller, and the method further comprises:
causing the access point to be cloud-controller-managed by using the communication interface to communicate with the cloud controller using the network address received in the data.

16. The method of claim 11, further comprising:
causing the access point to be local-controller-managed by using the communication interface to communicate with a respective local controller in communication with the communication interface: and
receiving management parameters from the respective local controller.

17. The method of claim 11, wherein receiving the data from the one or more other access points further comprises
transmitting a request for the data to the one or more other access points; and
receiving the data from one or more other access points in response to the request.

18. The method of claim 11, further comprising:
communicating with the cloud controller based on the access point booting up; and
receiving initial data from the cloud controller, wherein the initial data indicates whether the access point is to be cloud-controller-managed or local-controller-managed, the initial data superseding the data indicative of whether each of the one or more other access points are managed using the cloud controller or the local controller.

19. The access point of claim 1, wherein to receive the data from the one or more other access points the processor is further configured to:
passively receive a message from the one or more other access points, wherein the message includes the data and comprises at least one of a broadcast or multicast message.

20. The method of claim 11, wherein receiving the data from the one or more other access points further comprises:
passively receiving a message from the one or more other access points, wherein the message includes the data and comprises at least one of a broadcast or multicast message.

* * * * *